Patented Aug. 16, 1949

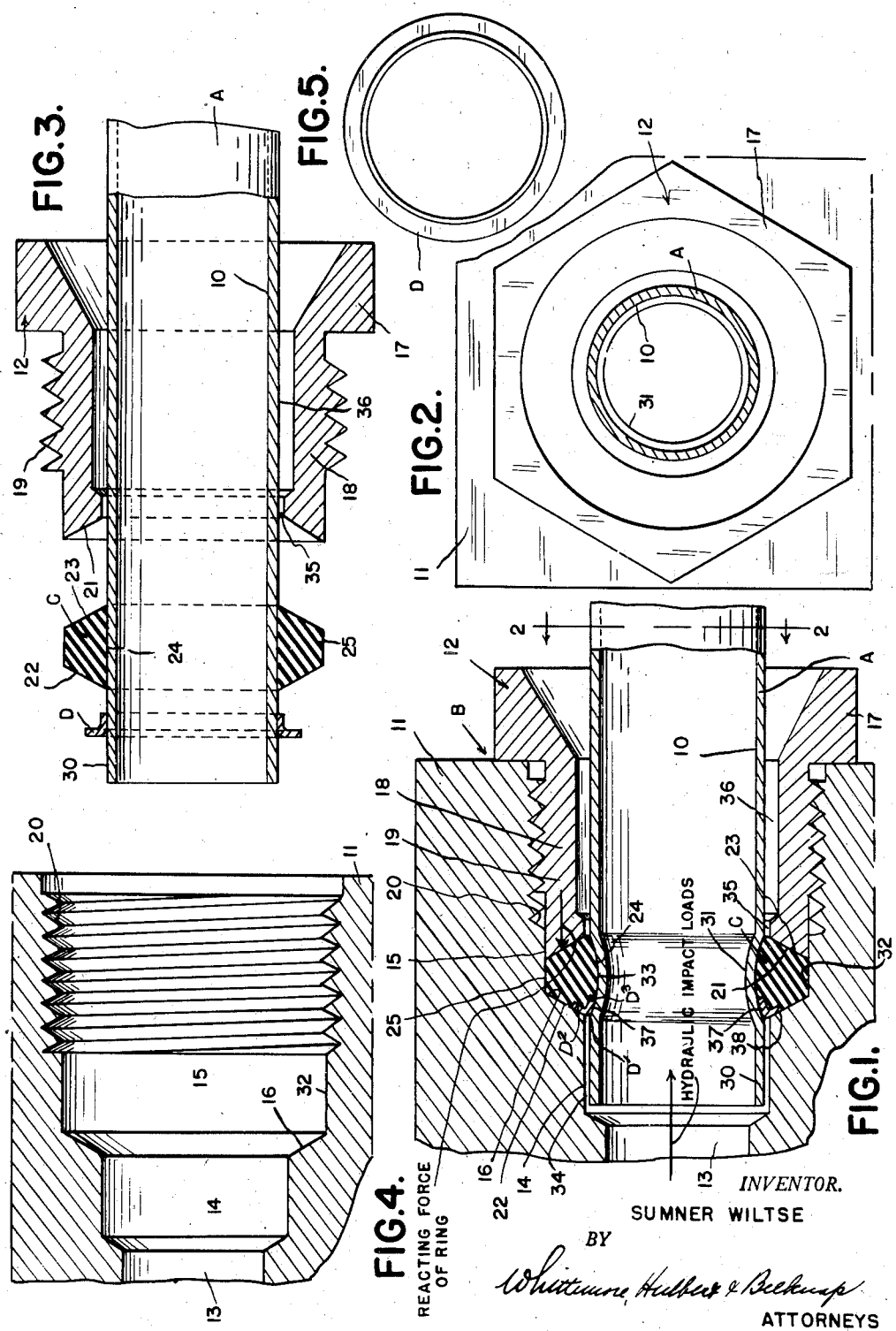

2,479,447

UNITED STATES PATENT OFFICE 2,479,447

FLUID LINE CONNECTION

Sumner Wiltse, Detroit, Mich., assignor to Vibraseal Corporation, Detroit, Mich., a corporation of Michigan Application February 7, 1945, Serial No. 576,597

8 Claims. (Cl. 285—90)

This invention relates generally to connections between tubing and fittings therefor, and refers more particularly to a fluid type connection between a high pressure hydraulic tube and a suitable fitting therefor.

Heretofore, in fluid line connections, a resilient sealing ring or gasket has been mounted in opposed annular grooves in the tubing and encircling fitting therefor to prevent relative endwise movement between the tubing and fitting, and clearance has been provided between the tubing and fitting to permit relative tilting movement between the parts. Ordinarily the tubing is ductile and does not return to its original shape, state, or condition after the annular groove aforesaid is formed therein. However, the sealing ring is usually formed of rubber or rubber composition and therefore has a high recovery rate. In fact, it has been found that this resilient ring is adapted to absorb any impact loads or forces applied thereto from the fluid in the tubing via the outer wall of the groove in which the ring is mounted, and to react like a spring under compression and thereby repeatedly deform and produce a hammer-like action against the inner wall of the annular groove in the tubing, tending to flatten the same. Consequently, when the tubing of the connection mentioned is employed as a high pressure hydraulic line, the impact loads or forces of the hydraulic fluid against the inner wall of the annular groove in the tubing cause the resilient ring in the groove to be repeatedly deformed endwise of the tube against the inner wall of said groove and thereby to hammer down and progressively deform the adjacent inner end portion of the tubing to a smaller diameter, permitting the tubing to slip out of the fitting.

Therefore, one of the essential objects of the present invention is to provide a fluid line connection having means, preferably in the form of a stop or abutment for the resilient ring, for effectively preventing any hammer-like action of the resilient ring being imparted to the inner side wall of the annular groove in the tubing.

Another object is to provide a fluid line connection wherein the stop or abutment is preferably formed of metal and is located at the inner side of the resilient ring for sealing engagement with the inner side walls of the opposed annular grooves in the fitting and tube.

Another object is to provide a fluid line connection wherein the stop or abutment is preferably in the form of a ferrule for the tube and is adapted to be readily sleeved thereon in tandem with the resilient ring before the annular groove is formed in the tube.

Another object is to provide a fluid line connection wherein the ferrule may be shaped to conform to the inner side walls of the opposed annular grooves when the annular groove in the tube is formed.

Another object is to provide a fluid line connection wherein the ferrule is preferably formed of cold rolled half hard steel capable of being shaped as aforesaid by the coaction of the cooperating sections of the fitting and the intermediate resilient ring when such sections of the fitting are tightened together.

Another object is to provide a fluid line connection wherein a thin walled tube equipped with a metal ferrule is capable of holding pressures that otherwise could not be held by a thin walled tube alone. Such combination of ferrule and thin walled tube is equal in resisting strength to a thicker walled tube which would be impractical with this type of fitting.

Another object is to provide a fluid line connection that is similar in construction, economical to manufacture, easy to install, and efficient in operation.

Other objects, advantages, and novel details of construction of this invention will be made more apparent as this description proceeds, especially when considered in connection with the accompanying drawing, wherein:

Figure 1 is a fragmentary longitudinal vertical sectional view through a fluid line connection embodying my invention.

Figure 2 is a sectional view taken on the line 2—2 of Figure 1.

Figure 3 is a fragmentary vertical sectional view through one section of the fitting, resilient ring, and ferrule upon the tubing, with portions of the latter broken away and in section, and showing the tubing in its initial condition before being deformed.

Figure 4 is a fragmentary vertical sectional view through the other section of the fitting; and Figure 5 is a detailed view of the ferrule.

Referring now to the drawing, A is the tubing, B is the fitting, C is the resilient sealing ring or gasket, and D is the metal ferrule of a fluid line connection embodying my invention.

As shown, the tubing A is formed of relatively soft metal such as aluminum, copper, brass and the like, and has thin walls 10. Such tubing may be any suitable size and is preferably utilized as a high pressure hydraulic line.

The fitting B is formed of harder metal and preferably comprises two sections 11 and 12 respectively. The section 11 may be a hydraulic brake housing, pump casing, or any other suitable element of a hydraulic or fluid line system, and preferably has a fluid passage 13 provided at the mouth thereof with stepped enlargements 14 and 15 respectively. Such section 11 is also provided between the stepped enlargements 14 and 15 with an inclined or bevelled wall or shoulder 16. The other section 12 of the fitting has a polygonal body 17 adapted to abut the section 11 and provided at one side with an axially extending tubular projection or nipple portion 18 adapted to extend within the outer enlargement 15 of the section 11 of the fitting. Such tubular projection 18 is provided adjacent the body 17 with an exteriorly threaded section 19 that is engageable with an interiorly threaded portion 20 of the outer enlargement 15 of the section 11 when the parts are assembled, and is provided at its free end with a surface 21 that is oppositely inclined relative to the inclined surface 16 of the section 11. Preferably these inclined surfaces 16 and 21 converge toward the outer enlargement 15 of the section 11 so as to squeeze the resilient ring C against the tubing A when the parts are assembled.

The resilient sealing ring C is preferably made of rubber, synthetic rubber, or rubber composition, preferably impervious to gasoline and oil and having advantageous characteristics for the purposes for which it is used. Preferably opposite sides 22 and 23 respectively of the ring C are inclined toward each other from the central opening 24 to the periphery 25 of the ring; however, any other suitable configuration may be employed, as desired.

The ferrule D is preferably L-shaped in cross section and is preferably .0022" to .0028" thick. It is preferably formed from cold rolled half hard steel.

In use, the tubing A is initially of uniform diameter throughout its length as illustrated in Figure 3. The section 12 of the fitting, resilient ring C, and metal ferrule D are then sleeved one after the other upon the tubing A as illustrated in Figure 3. The end portion 30 of the tubing is then inserted into the inner enlargement 14 of the section 11 of the fitting so that the ferrule D will abut the inclined surface 16 of said section, the resilient ring C will be between the inclined surfaces 16 and 21 of the sections 11 and 12 of the fitting, and the exteriorly threaded portion 19 of the section 12 will be engaged with the interiorly threaded portion 20 of the section 11. Then the polygonal body 17 of the section 12 is turned by a suitable tool (not shown) to cause the sections 11 and 12 to be tightened together so that the resilient ring C, ferrule D, and tubing 10 will be simultaneously deformed as illustrated in Figure 1.

When the parts are in the position illustrated in Figure 1, the tubing A will have an annular concave indentation or groove 31 in opposed relation to an annular groove 32 that is formed by the oppositely inclined surfaces 16 and 21 and outer enlargement 15, and the resilient ring C will fill completely and bear firmly against the walls of the opposed annular grooves 31 and 32 in the tube and fitting to provide a fluid tight seal therebetween. In this connection it will be noted that the opposed annular grooves 31 and 32 in the tubing and fitting cooperate with the resilient ring C to prevent endwise movement of the tubing A relative to the fitting B. Also it will be noted that the surface 33 of the resilient ring C engaging the concave groove 31 in the tubing conforms in curvature to said concave groove 31 and that there is sufficient clearance at 34, 35, and 36 respectively between the tubing A and fitting B to permit angular or tilting movement of the tubing relative to the fitting, or vice versa. In this connection it should be appreciated that the surfaces of the resilient ring C adhere or remain firmly in contact with the surfaces of the opposed grooves 31 and 32 so that the angular or tilting movement mentioned is taken up within the resilient body of the sealing ring C. Moreover the clearance between the tube A and fitting adjacent opposite walls of the opposed grooves therein is insufficient to permit extrusion of the sealing ring C from the fitting endwise of the tube A. The deformed ferrule D is now substantially V shape in cross section. By referring to Figure 1 it will be noted that the apex D' of the ferrule is in registration with the clearance 34 between the tube A and section 11 of the fitting and the legs D² and D³ of said ferrule overlap and have surface to surface sealing engagement with the inner walls 37 and 38 respectively of the opposed grooves 31 and 32. Actually this ferrule D serves as an interceptor for the impact loads of the hydraulic fluid as well as a stop or abutment for the deformed sealing ring C and distributes over a wider surface the impact loads imparted to the sealing ring C from the fluid in the tubing A via the inner side wall 37 of the annular groove 31 in the tubing. If such ferrule D were omitted, the reacting force of the resilient material of the sealing ring C, after absorbing the energy of the impact loads of the hydraulic fluid via the inner wall 37 of the annular groove 31, would cause the ring C to return like a spring against the inner wall 37 of the annular groove 31 in the tubing to deform the same. Successive action of this type would be in hammer-like fashion, hence the inner end portion 30 of the tubing would be progressively deformed to a smaller diameter, permitting the tubing to slip out of the fitting. However, the presence of the ferrule D between the sealing ring C and inner walls 37 and 38 of the opposed grooves 31 and 32 effectively prevents such destructive action of the resilient sealing ring C. Consequently the ferrule D serves as a guard for the end portion 30 of the tube while permitting relative tilting movement between the tube and fitting.

What I claim as my invention is:

1. In a fluid line connection of the class described, a thin walled tube, a fitting encircling said tube with clearance therebetween to permit tilting of the tube relative to the fitting or vice versa, a fluid-tight seal between the tube and fitting including a ring of resilient material sleeved on said tube within the fitting and a metal ferrule sleeved on said tube beside the ring within said fitting, said tube and fitting having opposed annular grooves receiving and cooperating with the ring and ferrule to prevent endwise movement of the tube relative to the fitting while permitting the tilting movement aforesaid, said ring and ferrule collectively filling completely and bearing firmly against the walls of the opposed annular grooves in the tube and fitting so that the tilting action aforesaid is taken up within the resilient body of the ring, opposite walls of the groove in the fitting being relatively movable and coacting to maintain the firm engagement aforesaid of the ring and ferrule with the walls of the opposed grooves respectively in the tube and fitting, the clearance between the tube and fitting adjacent opposite walls of the grooves therein being insufficient to permit extrusion of the ring from the fitting endwise of the tube, said ferrule being formed of very thin, half hard steel substantially V shape in cross section and spanning the space between the inner side walls respectively of said opposed annular grooves, the apex of the V being in registration with the clearance aforesaid between the tube and fitting and the legs of the V overlapping and having surface to surface sealing engagement with the inner side walls respectively of said opposed annular grooves aforesaid, the leg of the V in contact with the side wall of the groove in the fitting being of less outside diameter than the diameter of the bottom of the groove, whereby said ferrule forms a protecting barrier between the inner side of said ring and the fluid in said clearance and constitutes a stop or abutment for said ring to prevent any hammer-like action of said ring created by impact loads of fluid in the tube from being imparted to the inner side wall of the annular groove in said tube and has sliding contact with the said side wall of the groove in said fitting.

2. In a fluid line connection of the class described, a thin walled tube, a fitting encircling said tube with clearance therebetween to permit tilting of the tube relative to the fitting or vice versa, a fluid-tight seal between the tube and fitting including a ring of resilient material sleeved on said tube within the fitting and a thin metal ferrule sleeved on said tube beside the ring within said fitting, said tube and fitting having opposed annular grooves receiving and cooperating with the ring and ferrule to prevent endwise movement of the tube relative to the fitting while permitting the tilting movement aforesaid, said ring and ferrule collectively filling completely and bearing firmly against the walls of the opposed annular grooves in the tube and fitting so that the tilting action aforesaid is taken up within the resilient body of the ring, opposite walls of the groove in the fitting being relatively movable and coacting to maintain the firm engagement aforesaid of the ring and ferrule with the walls of the opposed grooves respectively in the tube and fitting, the clearance between the tube and fitting adjacent opposite walls of the grooves therein being insufficient to permit extrusion of the ring from the fitting endwise of the tube, said ferrule spanning the space between the inner side walls respectively of said opposed annular grooves, a portion of said ferrule being in registration with the clearance aforesaid between the tube and fitting and other portions of said ferrule overlapping and having surface to surface sealing engagement with the inner side walls respectively of said opposed annular grooves aforesaid, whereby said ferrule forms a protecting barrier between the inner side of said ring and the fluid in said clearance and constitutes a stop or abutment for said ring to prevent any hammer-like action of said ring created by impact loads of fluid in the tube from being imparted to the inner side wall of the annular groove in said tube.

3. In a fluid line connection of the class described, a thin walled tube, a fitting encircling the tube with clearance therebetween to permit tilting of the tube relative to the fitting or vice versa, a fluid-tight seal between the tube and fitting including a ring of resilient material sleeved on the tube within the fitting and a thin metal ferrule sleeved on said tube beside said ring, said tube and fitting having opposed annular grooves receiving and cooperating with the ring and ferrule to prevent endwise movement of the tube relative to the fitting while permitting the tilting movement aforesaid, opposite walls of the groove in the fitting being relatively movable and coacting to maintain the resilient sealing ring and ferrule firmly against the walls of the opposed grooves respectively in the tube and fitting so that the ring and ferrule are held in sealing engagement with the walls of the opposed grooves respectively in said tube and fitting during the tilting movement aforesaid, said ferrule being substantially V shape in cross section and spanning the space between the inner side walls respectively of said opposed annular grooves, the apex of the V being in registration with the clearance aforesaid between the tube and fitting, and the legs of the V overlapping and having surface to surface sealing engagement with the inner side walls respectively of said opposed annular grooves whereby said ferrule forms a protecting barrier between the inner side of said ring and the fluid in said clearance and constitutes a stop or abutment for said ring to prevent any hammer-like action of said ring created by impact loads of fluid in the tube from being imparted to the inner side wall of the annular groove in said tube.

4. In a fluid line connection of the class described, a tube, a fitting encircling the tube with clearance therebetween to permit tilting of the tube relative to the fitting or vice versa, a fluid-tight seal between the tube and fitting including a ring of resilient material sleeved on the tube within the fitting and a ferrule sleeved on said tube beside said ring, said tube and fitting having opposed annular grooves receiving and cooperating with the ring and ferrule to prevent endwise movement of the tube relative to the fitting while permitting the tilting movement aforesaid, opposite walls of the groove in the fitting being relatively movable and coacting to maintain the resilient sealing ring and ferrule firmly against the walls of the opposed grooves respectively in the tube and fitting so that the ring and ferrule are held in sealing engagement with the walls of the opposed grooves respectively in said tube and fitting during the tilting movement aforesaid, said ferrule spanning the space between the inner side walls respectively of said opposed annular grooves, a portion of said ferrule being in registration with the clearance aforesaid between the tube and fitting, and other portions of said ferrule overlapping and having surface to surface sealing engagement with the inner side walls respectively of said opposed annular grooves, whereby said ferrule forms a protecting barrier between the inner side of said ring and the fluid in said clearance and constitutes a stop or abutment for said ring to prevent any hammer-like action of said ring created by impact loads of fluid in the tube from being imparted to the inner side wall of the annular groove in said tube.

5. A flexible fluid line connection comprising a tube having a shallow annular groove adjacent one end, the wall of said groove at one side thereof making a small angle with the wall of said tube; a fitting encircling said tube, the inner wall of said fitting having annular clearance with respect to said tube, said fitting having a relatively deep annular groove therein in registry with the groove in said tube, a side wall of said groove adjacent the said wall of said shallow groove making an angle substantially greater than 45° with the inner wall of said fitting; an annular metallic ferrule having angularly related arms, each of which is in substantial surface-to-surface contact with the said wall of one of said grooves, the arm of said ferrule which contacts the said side wall of said relatively deep groove being substantially shorter than the said side wall thereof; and a ring of resilient material completely filling the annular space defined by said grooves and ferrule.

6. A thin walled tube having a shallow annular groove thereabout, the wall of said groove at one side thereof making a small angle with the wall of said tube adjacent thereto; a fitting encircling said tube and having annular clearance thereabout, said fitting having an interior annular groove in registry with the groove in said tube, the wall of the groove in said fitting corresponding to the said wall of the groove in said tube making an angle only slightly less than 90° with the wall of said fitting adjacent thereto, an annular metal ferrule having angularly related arms in surface-to-surface contact with said walls of said grooves and spanning the clearance therebetween, and a resilient ring under compression in said grooves and maintaining the arms of said ferrule in firm contact with said walls the outer diameter of said ferrule being less than the diameter of the bottom of the groove in said fitting to provide for generally radial movement of said ferrule in said fitting.

7. Means for establishing a flexible fluid-tight connection with a thin walled tube having an annular groove thereabout, comprising a fitting adapted to encircle the tube and to have annular clearance therewith, said fitting having an internal annular groove in registry with the groove in the tube, a very thin steel ferrule of annular shape adapted to be received in said grooves and to span the clearance between said fitting and the tube at one end of said grooves, said ferrule having angularly related arms each adapted to have substantial surface-to-surface contact with a wall of one of the aforementioned grooves adjacent the said end thereof, and a resilient ring under compression in the space defined by said grooves and adapted to press said ferrule firmly into contact with the said walls the outer diameter of said ferrule being less than the diameter of the bottom of the groove in said fitting to provide for generally radial movement of said ferrule in said fitting.

8. Means for establishing a flexible fluid-tight connection with a thin walled tube having a shallow annular groove thereabout, comprising a fitting adapted to encircle the tube and to have radial clearance therewith, said fitting having an internal, relatively deep annular groove in registry with the groove in the tube, a resilient ring adapted to be placed under compression in said two grooves, a very thin steel ferrule of annular shape having angularly related legs in surface-to-surface contact with corresponding side walls of said grooves, the leg in contact with the side wall of the groove in said fitting being of less outside diameter than the diameter of the bottom of the groove in said fitting, the said side wall of said relatively deep groove forming a large angle with the axis of the fitting to provide for generally radial sliding motion of said ferrule thereagainst.

SUMNER WILTSE.

REFERENCES CITED

The following references are of record in the file of this patent:

UNITED STATES PATENTS

| Number | Name | Date |
|---|---|---|
| 1,979,141 | Clark | Oct. 30, 1934 |
| 2,239,252 | Sander | Apr. 22, 1941 |
| 2,301,280 | Howe | Nov. 10, 1942 |
| 2,364,447 | Hynes | Dec. 5, 1944 |